US006636022B2

United States Patent
Sluijs (10) Patent No.: US 6,636,022 B2
(45) Date of Patent: Oct. 21, 2003

(54) CONTROLLED MULTI-OUTPUT DC/DC CONVERTER

(75) Inventor: Ferdinand Jacob Sluijs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/046,994

(22) Filed: Jan. 15, 2002

(65) Prior Publication Data

US 2002/0093315 A1 Jul. 18, 2002

(30) Foreign Application Priority Data

Jan. 17, 2001 (EP) .............................. 01200166

(51) Int. Cl.$^7$ ................................ G05F 1/10
(52) U.S. Cl. ...................... 323/222; 323/267
(58) Field of Search ................ 307/11, 18, 24, 307/33, 38, 39, 41; 323/222, 224, 225, 234, 265, 267, 283–285

(56) References Cited

U.S. PATENT DOCUMENTS

| 5,751,139 A | | 5/1998 | Jordan et al. ............... 323/222 |
| 5,886,508 A | * | 3/1999 | Jutras ......................... 323/267 |
| 6,075,295 A | * | 6/2000 | Li ................................ 307/39 |
| 6,222,352 B1 | * | 4/2001 | Lenk ........................... 323/227 |
| 6,437,545 B2 | * | 8/2002 | Sluijs .......................... 323/222 |

OTHER PUBLICATIONS

Patent Abstracts of Japan; vol. 1997, No. 10, Oct. 31, 1997, JP09168243A.

* cited by examiner

*Primary Examiner*—Michael Sherry
*Assistant Examiner*—Gary L. Laxton
(74) *Attorney, Agent, or Firm*—Steven R. Biren (57) ABSTRACT

A multi-output DC/DC converter (1;10;30;40;50;60), comprising inductive electrical energy storage means (L), switching means (S0–S7) and control means (6;9;31;41;51;61). The control means (6;9;31;41;51;61) are arranged for selectively operating the switching means (S0–S7) for transferring an amount of electrical energy from the energy storage means (L) to an output (A;B;C;D) of the DC/DC converter (1;10;30;40;50;60) providing an output voltage in accordance with a switching sequence based on comparing, by the control means (6;9;31;41;51;61) of the output voltage of each output (A;B;C;D) with an associated reference voltage. The control means (6;9;31;41;51;61) are arranged for operatively controlling the switching means (S0–S7) for each output (A;B;C;D) in accordance with an output individual switching cycle, wherein the switching sequence is comprised of the output individual switching cycles for transferring electrical energy to the outputs (A;B;C;D) of the multi-output DC/DC converter (1;10;30;40;50;60) in a predetermined order of priority.

8 Claims, 6 Drawing Sheets

CONTROLLED MULTI-OUTPUT DC/DC CONVERTER

The invention relates to a multi-output DC/DC converter, comprising inductive electrical energy storage means, switching means and control means, wherein the control means are arranged for selectively operating the switching means for transferring an amount of electrical energy from the energy storage means to an output of the DC/DC converter providing an output voltage in accordance with a switching sequence based on comparing, by the control means, of the output voltage of each output with an associated reference voltage.

A DC/DC converter of this type is know from U.S. Pat. No. 5,751,139.

In this known converter, if the output voltages of a plurality of outputs of the converter drop below their associated reference or threshold voltages, the thresholds determine which output receives electrical energy. That is, if the output voltage of a first or priority output drops below its reference voltage, this particular output always receives priority for service, i.e. transfer of electrical energy. In the event that the output voltage of the first output is above its reference voltage, a second output receives priority for service. If the output voltages of the first output and the second output are above their reference voltages, a third output receives service, et cetera.

This type of control sequence has the inherent disadvantage that in case the first output is heavily loaded, such that its output voltage does not reach its reference voltage, the second, third and other outputs of the known multi-output DC/DC converter will not receive any service, such that the output voltages of these outputs eventually will drop to zero.

Accordingly, it is an object of the present invention to propose an improved control sequence for a multi-output DC/DC converter of the type indicated in the preamble preventing an output voltage to drop to zero.

This object is solved in that the control means are arranged for operatively controlling the switching means for each output in accordance with an output individual switching cycle, and wherein the switching sequence is comprised of the output individual switching cycles for transferring electrical energy to said outputs of said multi-output DC/DC converter in a predetermined order of priority.

In accordance with the present invention, the outputs of the multi-output DC/DC converter are each serviced by a switching cycle individual to a particular output, and outputs which require the transfer of electrical energy are serviced in accordance with a mutual order of priority.

That is, in accordance with the present invention, outputs which require the transfer of electrical energy in order to update their output voltage, will receive service also in the case that the output voltage of a particular output remains below its reference voltage despite the transfer of electrical energy to this output. With the present invention it is effectively avoided that the output voltage of an output drops to zero, due to lack of service, i.e. lack of transfer of electrical energy.

In a further embodiment of the DC/DC converter according to the invention, the selection sequence comprises a wait cycle wherein no energy is transferred to an output of the multi-output DC/DC converter. In this wait cycle, typically no energy is stored in the energy storage means. The wait cycle provides a very efficient control of the output voltages of the outputs at a specified voltage level in case of varying loads, for example.

In a yet further embodiment of the invention, starting from the wait cycle, the outputs of the multi-output DC/DC converter are serviced in a predetermined order of priority. That is, if a plurality of outputs require the transfer of electrical energy while the converter is in its wait cycle, the respective outputs are serviced in accordance with a priority scheme. This priority scheme can be set such that the output which is most heavily loaded receives priority in the transfer of energy.

The improvement according to the present invention is applicable to control means which are arranged to operate the multi-output DC/DC converter either in one or both Pulse Width Modulation (PWM) mode and Pulse Frequency Modulation (PFM) mode switching.

The invention may be practised with a plurality of DC/DC converter designs, such as but not limited to, at least one of a group including multi-output DC/DC up converters, multi-output DC/DC down converters, multi-output DC/DC up/down converters, multi-output DC/DC inverting converters, multi-output DC/DC converters with positive and negative output, and multi-output DC/DC up/down converters with multiple positive and negative outputs.

The invention also relates to a power supply comprising a multi-output DC/DC converter as disclosed above, arranged for receiving an input voltage at input terminals and for providing controlled output voltages at multiple output terminals.

The DC/DC converter according to the invention is of particular advantage if applied in an electronic appliance, such as, but not limited to, a portable electronic appliance.

The invention will now be described in more detail with reference to the accompanying drawings, wherein like reference numerals designate parts providing the same or like function.

Figure 1:
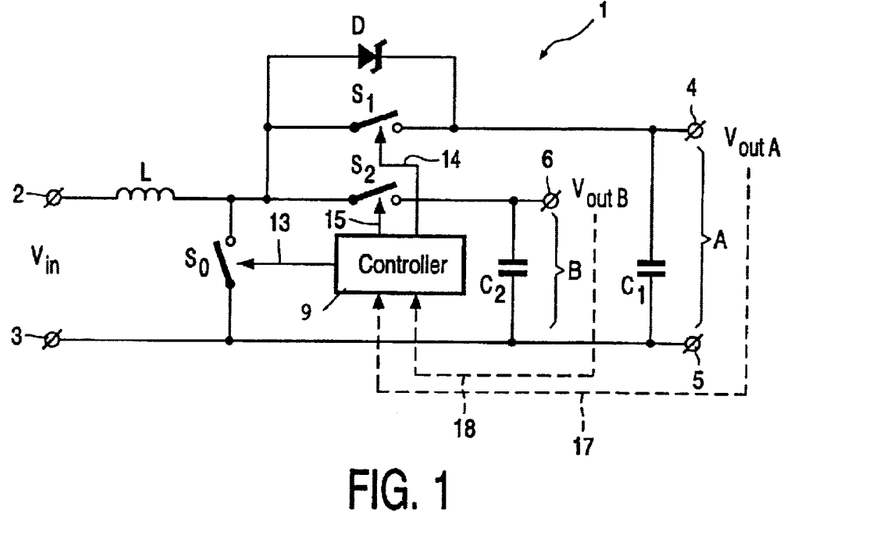
FIG. 1 shows a circuit diagram of a multi-output DC/DC up-converter having two outputs and comprising control means arranged in accordance with the present invention.

FIG. 1 shows a multi-output DC/DC up-converter 1, having two outputs A and B. The converter 1 comprises inductive electrical energy storage means taking the form of a coil L. The coil L and first switching means S 1 are series connected between a first input terminal 2 and a first output terminal 4 of the converter 1. The coil L and second switching means S2 are series connected between the first input terminal 2 and a second output terminal 6. The common connection of the coil L, the first switching means S1 and the second switching means S2 connects through switching means S0 to a second input terminal 3 and an output terminal 5, which is common for both outputs A and B. Across the first switching means S1 a diode D connects.

With the first and common output terminals 4, 5 a first smoothing capacitor C1 is parallel connected and, likewise, with the second and common output terminals 6, 5 a second smoothing capacitor C2 is parallel connected. The second input terminal 3 and the common output terminal 5 connect through a common conductive part of the circuit, for example the earth or mass conductor of an electronic appliance.

The converter 1 is operated to provide controlled or regulated output voltages VoutA and VoutB at the outputs A, B respectively, in response to an input voltage Vin at the input terminals 2, 3. To this end, a controller or control means 9 are provided for operating the switching means S0, S1 and S2 in accordance with a Pulse Frequency Modulation (PFM) and/or a Pulse Width Modulation (PWM) control scheme, wherein the output voltage Vout is higher than the input voltage Vin. The control of the switching means S0, S1 and S2 is schematically indicated by arrows 13, 14, and 15. Measurement of the output voltages VoutA and VoutB by the control means 9 is schematically indicated by dashed arrows 17, 18, respectively.

Figure 2:
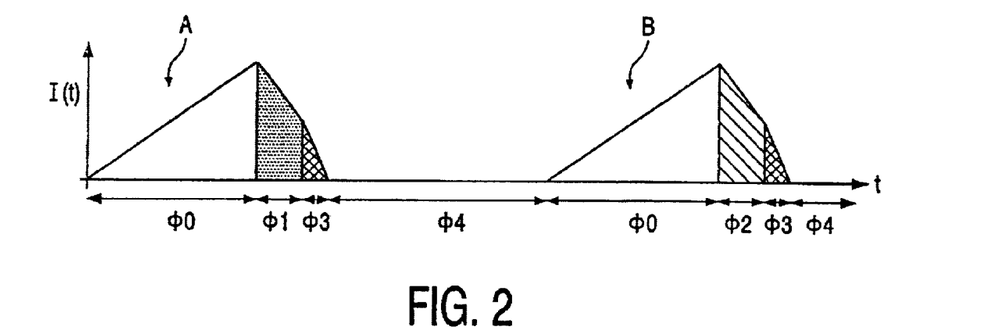
FIG. 2 shows, in a graphic representation, the current flow in the energy storage means in the DC/DC converter shown in FIG. 1, for typical Pulse Frequency Modulation (PFM) mode switching cycles.

FIG. 2 shows the coil current I against the time t in a typical switching cycle in PFM mode, wherein the current I through the coil L becomes zero. FIG. 2 shows output individual switching cycles for each of the outputs A and B. In a first phase $\Phi 0$, the switching means S0 are closed, that is in a current conductive state, and the switching means S1 and S2 are open, that is in a non-current conductive state. During the first phase $\Phi 0$ current flows only through the coil L, thereby storing electrical energy therein.

During phase $\Phi 1$ of the switching cycle for output A, the switching means S0 and the second switching means S2 are open and the first switching means S1 are closed. In this phase, energy built up in the coil L is transferred to the output terminals 4, 5 of the first output A, resulting in an output voltage VoutA which is higher than the input voltage Vin.

The first phase $\Phi 1$ is followed by a third phase $\Phi 3$ wherein all switches are open and the remaining energy in the coil L is transferred to the first output A via the diode D. At the end of the third phase there is no energy in the coil, indicated as phase $\Phi 4$.

The switching cycle for transferring electrical energy to the second output B of the converter likewise comprises a phase $\Phi 0$ wherein energy is stored in the coil L followed by a second phase $\Phi 2$ wherein the switching means S0 and the first switching means S1 are open and the second switching means S2 are closed. In this second phase $\Phi 2$ energy is transferred from the coil L to the second output B, resulting in an output voltage VoutB at the output terminals 6, 5. The output voltage VoutB is higher than the input voltage Vin. The second phase $\Phi 2$ is followed by the third phase $\Phi 3$ and the fourth phase $\Phi 4$, as disclosed above.

The ratio between the average number of $\Phi 0, \Phi 1, \Phi 3$ and $\Phi 0, \Phi 2, \Phi 3$ cycles determines the amount of electrical energy which is transferred to output A and output B, respectively. The ratios $\Phi 1/\Phi 0$ and $\Phi 2/\Phi 0$ are determined by the input and output voltages. The third phase $\Phi 3$ is added in order to end each cycle with a zero coil current I.

In accordance with the present invention, the output voltages VoutA and VoutB are controlled by the control means 9 following a switching sequence comprised of the output individual switching cycles, as shown in FIG. 2, in such a manner that electrical energy to the outputs A and B of the converter 1 is transferred in a predetermined order of priority. In order to determine whether the output voltage of a particular output has to be updated, all output voltages of the outputs of the converter 1 are measured at the end of each switching cycle and continuously during the phase wherein there is no energy in the coil L, i.e. the energy storage means. That is phase $\Phi 4$ shown in FIG. 2.

Figure 3:
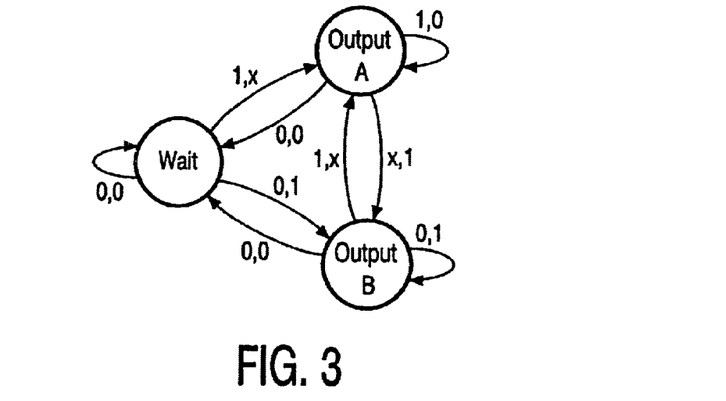
FIG. 3 shows, in a mode state diagram, a switching sequence in accordance with the invention for the multi-output DC/DC up-converter shown in FIG. 1 operated in PFM mode.

FIG. 3 shows a mode state diagram of the control principle in accordance with the present invention for the multi-output DC/DC converter 1 shown in FIG. 1, operated in PFM mode.

The mode state diagram comprises three states: a first state, called output A, wherein electrical energy is transferred to the first output A in accordance with a switching cycle individual to the first output A; a second state, called output B, wherein electrical energy is transferred to the second output B in accordance with a switching cycle individual to the second output B, and a third state which is a wait cycle wherein no energy is transferred at all. In the diagram, each state is indicated by a circular box and the transitions from one state to another are indicated by arrows accompanied by a transition condition, that is the condition under which one state is followed by another state.

The transition condition is determined by measuring the output voltages VoutA and VoutB and comparing same with their reference voltages VrefA and VrefB, respectively, associated to each of the outputs A, B. The comparison of the output voltages and the reference or threshold voltages is performed by the control means 9. In the present example, if the output voltage of a particular output drops below its associated reference voltage, i.e. Vout<Vref, the transition condition is set to a logic "1". If the output voltage Vout is above its reference voltage Vref, the transition condition is set to a logic "0" The condition x indicates a so-called "don't care", that is the logic value of the transition condition is not of importance for the transition. The transition conditions for the several outputs are separated by a comma. Thus, for example, the transition condition 1, 0 refers to the case wherein VoutA<VrefA and VoutB≧VrefB.

For the wait state the transition conditions in the state diagram are:
if (VoutA<VrefA)→Output A
else if (VoutB<VrefB)→Output B
    else→Wait
For the output A state the transition conditions in the state diagram are:
if (VoutB<VrefB)→Output B
else if (VoutA<VrefA)→Output A
    else→Wait
For the output B state the transition conditions in the state diagram are:
if (VoutA<VrefA)→Output A
else if (VoutB<VrefB)→Output B
    else→Wait As can be seen from the state diagram of FIG. 3, after output A has been serviced, that is after energy has been transferred to output A in accordance with its output specific switching cycle, output B will be serviced, if required. That is, if its output voltage VoutB is less than it's associated reference voltage VrefB, i.e. transition condition x, 1. In case of an overload, both output voltages will drop since both outputs are assumed to have equal priority. This is implemented by giving the other output first priority for the next cycle after each switching cycle. Thus, from the output B state a transition to the output A state occurs, transition condition 1, x and from the output A state a transition occurs to the output B state, etcetera. Only if both outputs do not require service, a transition to the wait state occurs.

Figure 4:
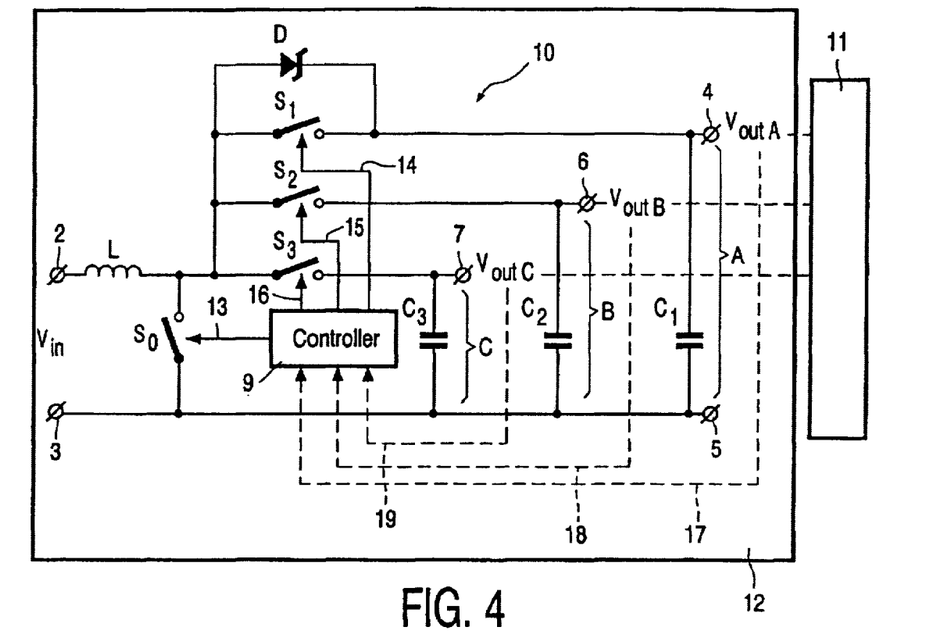
FIG. 4 shows a multi-output DC/DC up-converter having three outputs and comprising control means arranged in accordance with the present invention.

The principal accordance to the invention can be best illustrated with reference to FIG. 4 showing a multi-output DC/DC up-converter 10 having three outputs A, B and C. That is, output A having output terminals 4, 5; output B having output terminals 6, 5 and output C having a third output terminal 7 and the common output terminal 5. Third switching means S3 connect the coil L to the third output terminal 7. Between the third output terminal 7 and the common output terminal 5 a third smoothing capacitor C3 connects. Control means 9 are provided for controlling the transfer of energy from the energy storage means, i.e. the coil L, to the outputs A, B and C.

The control of the switching means S0, S1, S2 and S3 by the control means 9 is schematically indicated by arrows 13, 14, 15 and 16. Measurement of the output voltages Vout of the outputs A, B and C by the control means 9 is schematically indicated by dashed arrows 17, 18 and 19, respectively.

Likewise as indicated with reference to the converter 1 shown in FIG. 1, each output A, B, C of the converter 10 is operated with an individual switching cycle in accordance with the graphic representation shown in FIG. 2.

Figure 5:
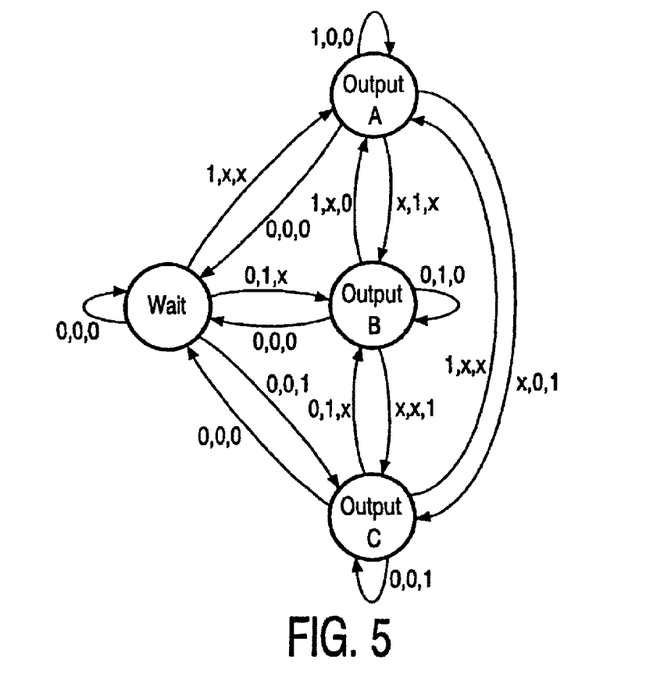
FIG. 5 shows, similar to FIG. 3, a mode state diagram for controlling the output voltages of the multi-output DC/DC converter shown in FIG. 4.

The manner of servicing the outputs A, B and C of the multi-output DC/DC converter 10 of FIG. 4 in accordance with the invention is illustrated by the mode state diagram of FIG. 5.

Similar to FIG. 3, a wait state is introduced, wherein there is no energy in the energy storage means, i.e. the coil L.

For the wait state the transition conditions in the state diagram are:
  if (VoutA<VrefA)→Output A
  else if (VoutB<VrefB)→Output B
    else if (VoutC<VrefC)→Output C
      else→Wait For the output A state the transition conditions in the state diagram are:
  if (VoutB<VrefB)→Output B
  else if (VoutC<VrefC)→Output C
    else if (VoutA<VrefA)→Output A
      else→Wait For the output B state the transition conditions in the state diagram are:
  if (VoutC<VrefC)→Output C
  else if (VoutA<VrefA)→Output A
    else if (VoutB<VrefB)→Output B
      else→Wait For the output C state the transition conditions in the state diagram are:
  if (VoutA<VrefA)→Output A
  else if (VoutB<VrefB)→Output B
    else if (VoutC<VrefC)→Output C
      else→Wait As can be seen from the state diagram, starting from the wait state priority is given for service to output A, i.e. transition condition 1, x, x. From output A priority of service is given to output B, transition condition x, 1, x and from output B priority is given for service to output C, i.e. transition condition x, x, 1. Thus, in accordance with the invention, electrical energy is transferred to the outputs of the multi-output DC/DC converter in a predetermined order of priority and such that all outputs receive service in order to avoid that the output voltages of two or more of the outputs drop to zero in case one of the outputs is so heavily loaded that it continuously requires the transfer of energy.

It will be appreciated that from output A service will be provided to output C in case output B does not require the transfer of energy, i.e. transition condition x, 0, 1.

Although in FIG. 5 a wait state is shown, it has to be appreciated that it is not necessarily required that the converter 10 will come into the wait state. If, for example, output A requires service while output C receives a transfer of energy, the next switching cycle will be servicing of output A, that is transition condition 1, x, x without entering the wait state.

Those skilled in the art will appreciate that, although the state diagram of FIG. 5 shows an order of priority wherein output B is serviced after output A and output C is serviced after output B, the control algorithm can also be implemented such that output C will receive priority for service after output A, whereas output B will be serviced after output C, etcetera.

Figure 6:
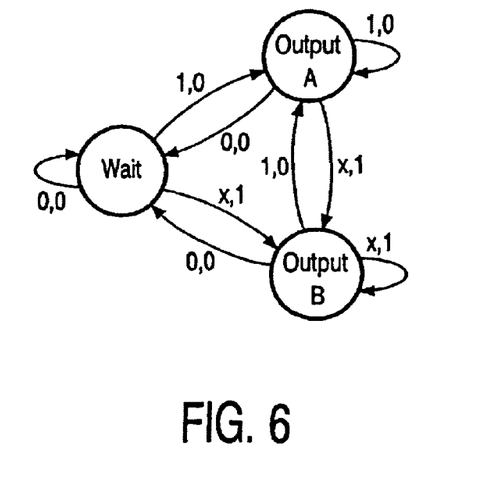
FIG. 6 shows a mode state diagram similar to FIG. 3, wherein another output receives a higher priority compared to FIG. 3.

FIG. 6 shows a mode state diagram for the converter 1 of FIG. 1, wherein output B receives a higher priority than output A, compared to the state diagram shown in FIG. 3. That is:
  if (VoutB<VrefB)→Output B
    else if (VoutA<VrefA)→Output A
      else→Wait The control algorithm according to the invention is applicable for both PFM and PWM operated converters.

Figure 7:
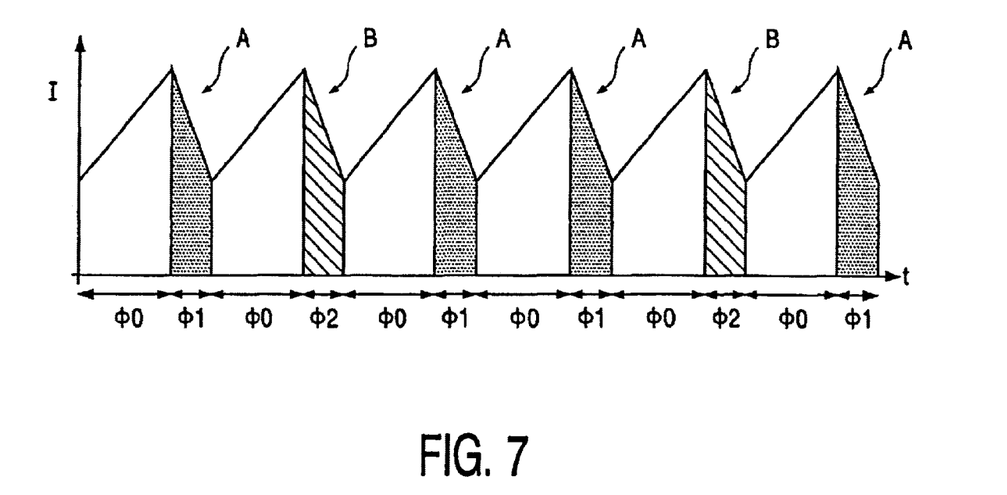
FIG. 7 shows, in a graphic representation, the current flow in the energy storage means in the DC/DC converter shown in FIG. 1, for typical Pulse Width Modulation (PWM) mode switching cycles.

FIG. 7 shows the coil current I against the time t in a typical switching cycle in PWM mode, wherein the current I through the coil L does not become zero. FIG. 7 shows output individuals switching cycles for each of the outputs A and B. In a first phase Φ0, the switching means S0 are closed, that is in a current conductive state, and the switching means S1 and S2 are open, that is in a non-current conductive state. During the first phase Φ0 current flows through the coil L, thereby storing electrical energy therein.

During a second phase Φ1, the switching means, S1 are closed and the switching means S0 and S2 are open. In this phase, electrical energy built up in the coil L is transferred to the output terminals 4, 5 of the first output A, resulting in an output voltage VoutA which is higher than the input voltage Vin.

During a third phase Φ2, the switching means S2 are closed and the switching means S0 and S1 are open. In this phase, energy built up in the coil L is transferred to the output terminals 6,5 of the second output B, resulting in an output voltage VoutB which is higher than the input voltage Vin.

The PWM mode is to be used in case one of the outputs A, B requires a relatively high output power. For example, if output A is taken as a main output, with this output in PWM mode the controller 9 will set the duty cycle, that is the length in time of the first phase Φ0 of an output individual switching cycle, wherein electrical energy is stored in the coil L, divided by the total length in time of a complete switching sequence, according to the power demand on output A. For the duty cycle of output B three options remain: using a fixed duty cycle which is related to the ratio of the input and output voltage of output A; using a variable duty cycle which is related to the ratio of the input and output voltage of output B and the duty cycle of the main output, i.e. output A, and using the same duty cycle for output B as the duty cycle for the main output, that is output A. Output B may be controlled in both PWM and PWFM mode.

Figure 8:
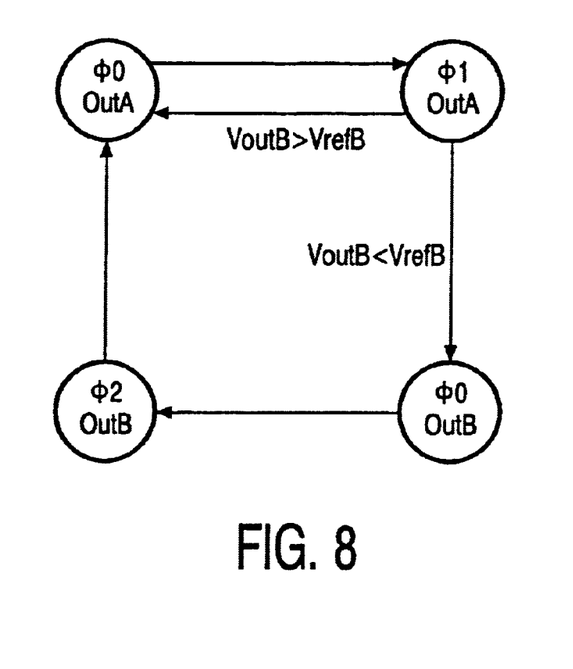
FIG. 8 shows, in a mode state diagram, a switching sequence in accordance with the invention for the multi-output DC/DC up-converter shown in FIG. 1 operated in PWM mode.

FIG. 8 shows a mode state diagram of the control principle in accordance with the present invention, for the multi-output DC/DC converter 1 shown in FIG. 1, operated in PWM mode.

The mode state diagram of FIG. 8 comprises four states which contain two conversion cycles: a conversion cycle for output A and a conversion cycle for output B. The DC/DC converter is continuously switched in PWM mode and delivers power to output A. And the voltage at output B drops below its reference level VoutB<VrefB, a switching cycle for output B is started. After this cycle for output B, a switching cycle for output A starts again.

The duty cycle of the PWM controller determines the length of the phases Φ0 and Φ1 of the conversion cycle for output A. For the duty cycle of output B one of the described options can be chosen. From the state diagram of FIG. 8 it can be seen that if the output voltage at output B remains above its reference voltage, i.e. VoutB>VrefB, the conversion cycle for output A (Φ0, Φ1) will continue.

In a further embodiment of the invention, the ratio of the power divided over the outputs A, B can be changed by introducing counters in both conversion cycles. These counters then determine when a transition to the other conversions cycle is allowed.

Figure 9:
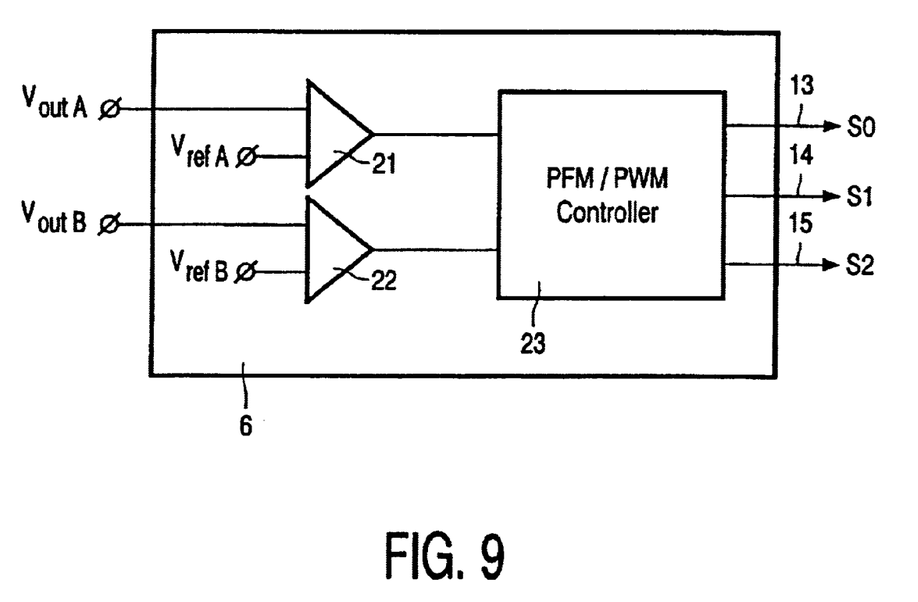
FIG. 9 shows a block diagram of an embodiment of control means according to the invention.

FIG. 9 shows, in a block diagram, an embodiment of the control means 9 of the DC/DC converter 1 shown in FIG. 1, in accordance with the present invention.

Comparator means 21, 22 are provided for comparing the output voltage Vout of a particular output against a reference voltage Vref set for this output. That is, comparator means 21 compare VoutA against VrefA, and comparator means 22 compare VoutB against VrefB. The output of the comparator means 21, 22 is provided as an input signal to a controller 23 for driving the switching means S0, S1, and S2.

Those skilled in the art will appreciate that the control means 9 of converter 10 of FIG. 4 are operated with three comparator means and will be arranged for driving the switching means S0, S1, S2, and S3.

The control principle according to the invention is not limited to multi-output DC/DC up-converters of the type shown in FIG. 2 and FIG. 5.

Several other DC/DC converters having a plurality of outputs can be controlled in accordance with the invention, either arranged as up-converter or down-converter or a combination of both.

Figure 10:
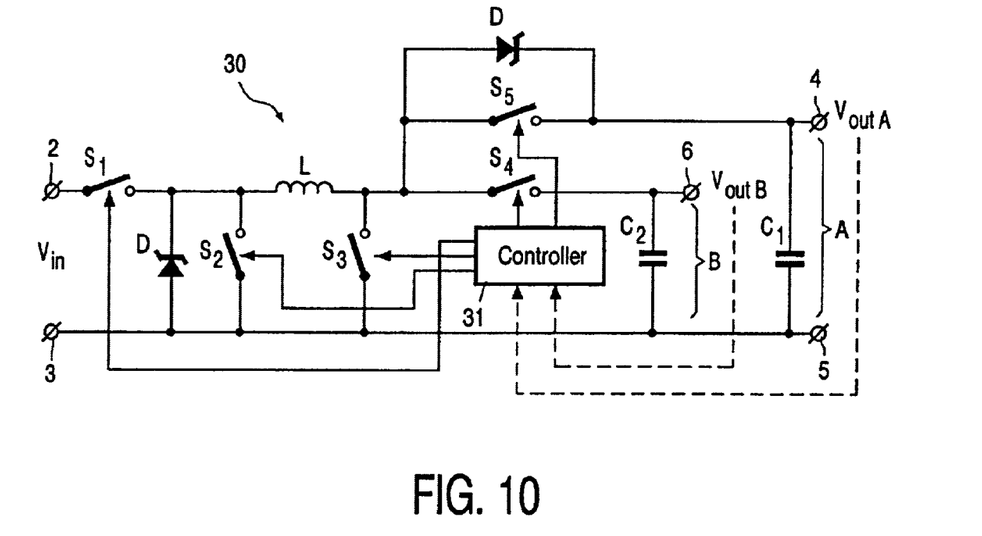
FIGS. 10, 11, 12, and 13 show, in a circuit diagram representation, several embodiments of multi-output DC/DC converters comprising control means in accordance with the present invention.

FIG. 10 shows a circuit diagram of a multi-output DC/DC up/down-converter 30 having two outputs A, B and control means 31 arranged for operating the converter 30 in accordance with the control principles of the present invention, as outlined above. The converter shown is a combination of a so-called boost and buck converter. In the boost (up) mode, the switching means S1 are closed and the switching means S2 are open. The switching means S3 and either S4 or S5, depending on which of the outputs receives output power, are operated for up-converting the input voltage Vin applied at the input terminals.

In the buck mode, switching means S3 are open and either one of the switching means S4 or S5 is closed, such that with the switching means S1 and S2 the input voltage can be down-converted to an output voltage lower than the input voltage. A converter of this type is known from the international patent application WO 95/34121 of applicant.

Figure 11:
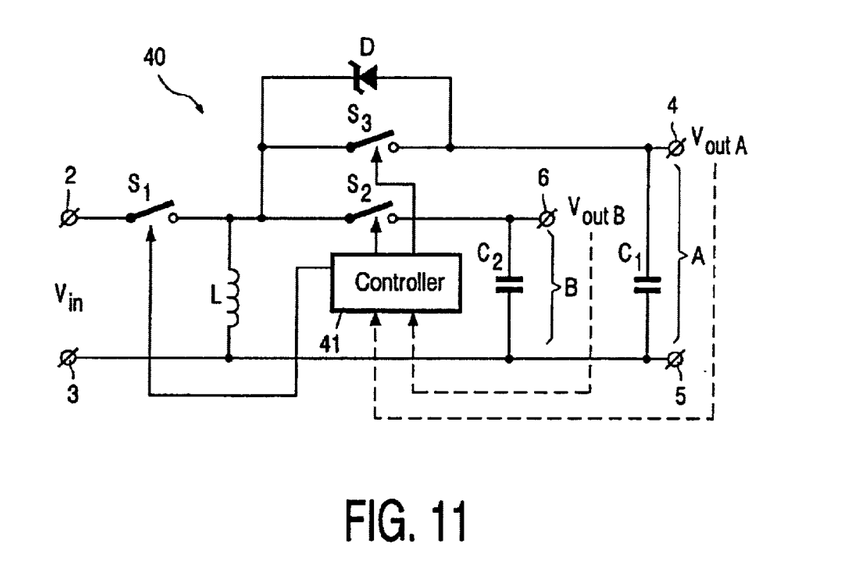

FIG. 11 is a circuit diagram of a multi-output DC/DC inverting converter 40 having two outputs A, B, providing a negative output voltage compared to the input voltage Vin and having control means 41.

Figure 12:
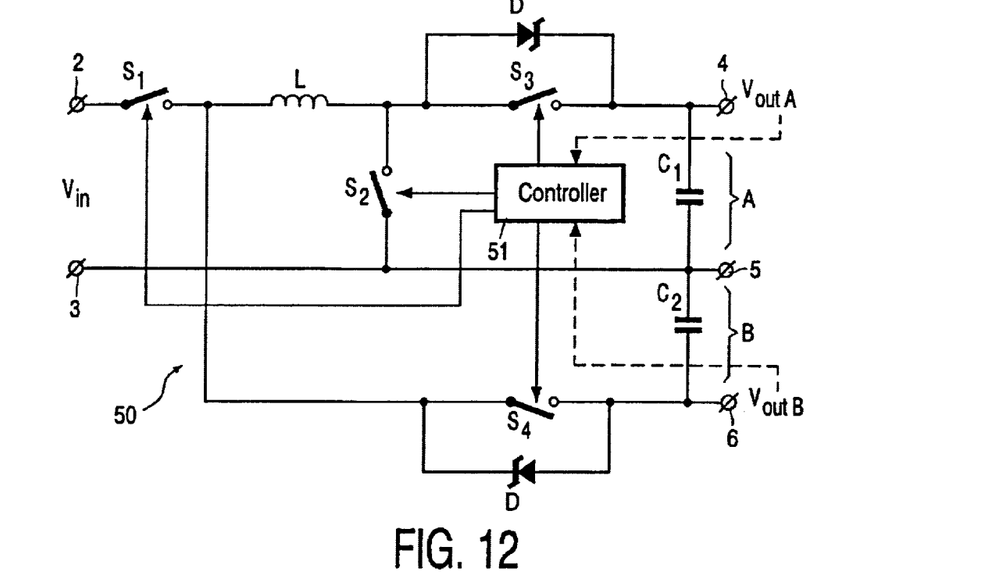

FIG. 12 shows a circuit diagram of a multi-output DC/DC converter 50 having a positive output A and a negative output B and control means 51.

Figure 13:
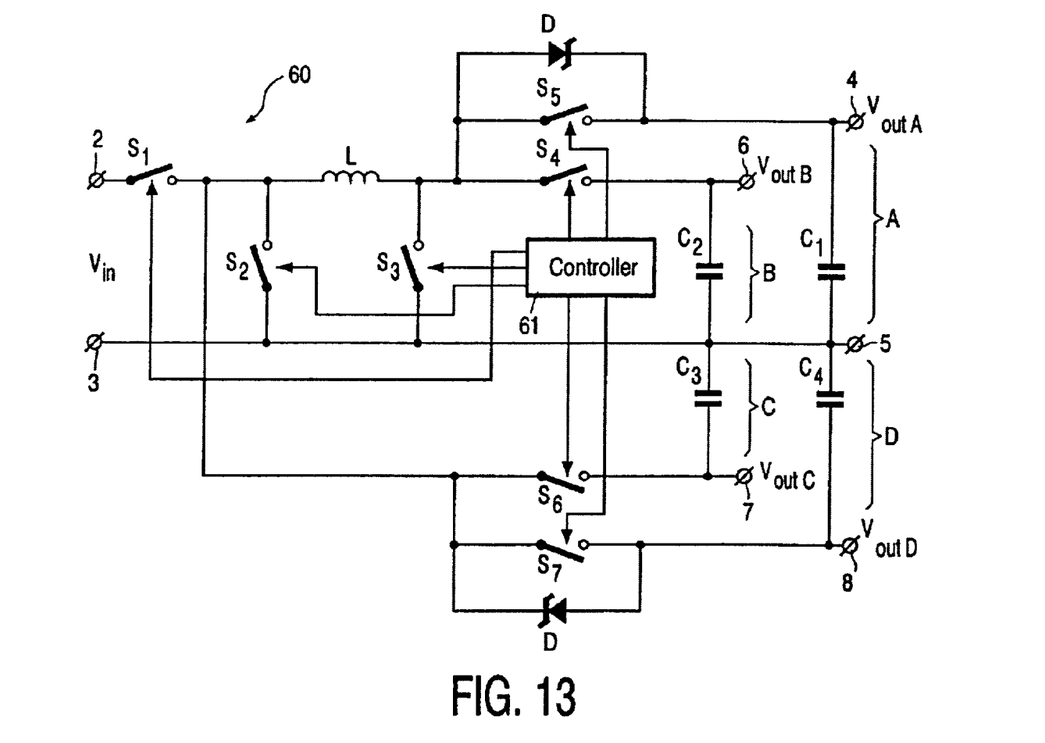

FIG. 13 shows a circuit diagram of a multi-output DC/DC up/down-converter 60 having two positive outputs A and B and two negative outputs C and D at output terminals 4, 6, 7, 8, respectively, and control means 61.

For all of the circuit diagrams shown in FIGS. 9, 12 and 13, the control means 41, 51 and 61 are arranged for operating in accordance with the present invention.

Those skilled in the art will appreciate that in the DC/DC converter 10, for example, the switching means which can be arranged across the diode D can be omitted. However, to increase the power conversion efficiency of the DC/DC converter 10, use of separate switching means are preferred to avoid a relatively large voltage drop across the respective diodes.

The DC/DC converter operating in accordance with the principles of the present invention, may be used with or in an electronic appliance 11, such as a portable electronic appliance, or arranged to form a separate power supply, schematically indicated by block 12 in FIG. 5.

What is claimed is:

1. A multi-output DC/DC converter, comprising inductive electrical energy storage means, switching means and control means, wherein said control means are arranged for selectively operating said switching means for transferring an amount of electrical energy from said energy storage means to an output of said DC/DC converter providing an output voltage in accordance with a switching sequence based on comparing, by said control means of the output voltage of each output with an associated reference voltage, characterised in that said control means are arranged for operatively controlling said switching means for each output in accordance with an output individual switching cycle, wherein said switching sequence is comprised of said output individual switching cycles for transferring electrical energy to said outputs of said multi-output DC/DC converter in a predetermined order of priority, and wherein electrical energy is transferred to an output having a higher priority during a next switching cycle.

2. A multi-output DC/DC converter according to claim 1, wherein said selection sequence comprises a wait cycle wherein no energy is transferred to an output of said multi-output DC/DC converter.

3. A multi-output DC/DC converter according to claim 2, wherein said control means are arranged for transferring electrical energy from said wait cycle to an output of said multi-output DC/DC converter following a predetermined order of priority.

4. A multi-output DC/DC converter according to claim 3, wherein said control means are arranged for comparing the output voltage of each output of said multi-output DC/DC converter with its associated reference voltage at the end of each switching cycle and continuous during said wait cycle.

5. A multi-output DC/DC converter according to claim 1, wherein said control means are arranged to operate in either one or both a Pulse With Modulation (PWM) mode and a Pulse Frequency Modulation (PFM) mode switching.

6. A multi-output DC/DC converter according to claim 1, comprising at least one of a group including multi-output DC/DC up converters, multi-output DC/DC down converters, multi-output DC/DC up/down converters, multi-output DC/DC inverting converters, multi-output DC/DC converters with positive and negative output, and multi-output DC/DC up/down converters with multiple positive and negative outputs.

7. A power supply comprising a multi-output DC/DC converter according to claim 1, arranged for receiving an input voltage at input terminals and for providing controlled output voltages at multiple output terminals of said power supply.

8. An electronic appliance comprising a multi-output DC/DC converter according to claim 1.

* * * * *